(12) United States Patent
Karpeichyk et al.

(10) Patent No.: US 12,465,271 B2
(45) Date of Patent: Nov. 11, 2025

(54) SYSTEMS INCLUDING WEARABLE ELECTROENCEPHALOGRAPHY DEVICES WITH MOVABLE BAND(S) AND METHODS OF USE THEREOF

(71) Applicant: PigPug, Inc., Brooklyn, NY (US)

(72) Inventors: Vitali Karpeichyk, Brooklyn, NY (US); Juan Ricardo Diaz, Sweetwater, FL (US); Andrei Pliachko, Brest (BY); Ivan Shmatko, Kharkov (UA); Andrei Savich, Minsk (BY); Dzmitry Kremez, Minsk (BY)

(73) Assignee: PigPug, Inc., Brooklyn, NY (US)

( * ) Notice: Subject to any disclaimer, the term of this patent is extended or adjusted under 35 U.S.C. 154(b) by 0 days.

(21) Appl. No.: 18/905,886

(22) Filed: Oct. 3, 2024

(65) Prior Publication Data

US 2025/0057464 A1    Feb. 20, 2025

Related U.S. Application Data

(63) Continuation of application No. PCT/US2023/071098, filed on Jul. 27, 2023.
(Continued)

(51) Int. Cl.
*A61B 5/369* (2021.01)
*A61B 5/00* (2006.01)
(Continued)

(52) U.S. Cl.
CPC .......... *A61B 5/369* (2021.01); *A61B 5/0006* (2013.01); *A61B 5/14552* (2013.01); *A61B 5/31* (2021.01);
(Continued)

(58) Field of Classification Search
CPC ......... A61B 5/369; A61B 5/31; A61B 5/0006; A61B 5/14552; A61B 5/6803; A61B 5/7267; A61B 5/7275; A61B 5/7405
See application file for complete search history.

(56) References Cited

U.S. PATENT DOCUMENTS 6,461,297 B1 * 10/2002 Pagnacco ............. A61B 5/6814
                                                              600/300
10,143,397 B2 * 12/2018 Altshuler ............... A61B 5/291
(Continued)

OTHER PUBLICATIONS

International Search Report and Written Opinion from International Application No. PCT/US2023/071098 dated Jan. 26, 2024.

*Primary Examiner* — Alex M Valvis
*Assistant Examiner* — Jonathan M Haney
(74) *Attorney, Agent, or Firm* — GREENBERG TRAURIG, LLP

(57) ABSTRACT

In at least some embodiments, the present disclosure describes an electroencephalography (EEG) device having a main band and at least one moveable band. The main band may include fixed EEG sensors positioned on the main band so as to contact a scalp of the wearer in at least two scalp zones. The at least one moveable band may include at least one moveable EEG sensor. The moveable band may move relative to the main band to adjust to a position of the moveable EEG sensor(s) on the scalp of the wearer in at least one adjustable zone. The EEG device may include a processing device to measure EEG measurements using the fixed and/or movable EEG sensors, and transmit the EEG measurements to an external computing device to determine a mental condition, a mental state or both of the wearer based on the EEG measurements.

24 Claims, 9 Drawing Sheets

Related U.S. Application Data

(60) Provisional application No. 63/392,719, filed on Jul. 27, 2022.

(51) Int. Cl.
*A61B 5/1455* (2006.01)
*A61B 5/31* (2021.01)

(52) U.S. Cl.
CPC .......... *A61B 5/6803* (2013.01); *A61B 5/7267* (2013.01); *A61B 5/7275* (2013.01); *A61B 5/7405* (2013.01)

(56) References Cited

U.S. PATENT DOCUMENTS

| | | | | |
|---|---|---|---|---|
| 2012/0150545 | A1* | 6/2012 | Simon | A61B 5/6804 704/270 |
| 2014/0051961 | A1 | 2/2014 | Badower et al. | |
| 2014/0180158 | A1* | 6/2014 | Cheng | A61B 5/6803 600/544 |
| 2014/0257073 | A1* | 9/2014 | Machon | A61B 5/6803 600/383 |
| 2014/0350431 | A1* | 11/2014 | Hagedorn | A61B 5/4836 600/15 |
| 2015/0313496 | A1 | 11/2015 | Connor | |
| 2016/0235323 | A1* | 8/2016 | Tadi | A61B 5/0006 |
| 2016/0354571 | A1* | 12/2016 | Grashow | A61M 16/065 |
| 2020/0060571 | A1* | 2/2020 | Dauguet | A61B 5/369 |
| 2020/0215326 | A1 | 7/2020 | Wingeier et al. | |
| 2020/0237249 | A1 | 7/2020 | Gunasekar et al. | |
| 2020/0373001 | A1 | 11/2020 | Harrison et al. | |
| 2021/0068662 | A1* | 3/2021 | Barati | A61B 5/0075 |
| 2022/0061678 | A1* | 3/2022 | Schulhauser | A61B 5/165 |
| 2022/0415476 | A1* | 12/2022 | Connor | G06V 20/20 |

* cited by examiner

SYSTEMS INCLUDING WEARABLE ELECTROENCEPHALOGRAPHY DEVICES WITH MOVABLE BAND(S) AND METHODS OF USE THEREOF

CROSS-REFERENCED TO RELATED APPLICATIONS

This application is a continuation of International Application No. PCT/US2023/071098, filed Jul. 27, 2023 and entitled "SYSTEMS INCLUDING WEARABLE ELECTROENCEPHALOGRAPHY DEVICES WITH MOVABLE BAND(S) AND METHODS OF USE THEREOF," which claims priority to U.S. Provisional Application No. 63/392,719 filed Jul. 27, 2022 and entitled "SYSTEMS INCLUDING WEARABLE ELECTROENCEPHALOGRAPHY DEVICES WITH MOVABLE BAND(S) AND METHODS OF USE THEREOF," and is herein incorporated by reference in its entirety.

BACKGROUND

Typically, electroencephalography (EEG) may be utilized to record an electrogram of the spontaneous electrical activity of the brain. The biosignals detected by EEG may represent the postsynaptic potentials of pyramidal neurons in the neocortex and allocortex. Voltage fluctuations measured by the EEG bioamplifier and electrodes may allow the evaluation of normal brain activity. As typically considered, the electrical activity monitored by EEG may originate in neurons in the underlying brain tissue, the recordings made by the electrodes on the surface of the scalp may vary in accordance with their orientation and distance to the source of the activity.

SUMMARY

In some embodiments, as detailed herein, an illustrative inventive system of the present disclosure may include an illustrative inventive wearable EEG device that may be a electroencephalography device with, without limitations, at least two bands (e.g., a main band and a movable band); hardware and/or software components for collecting, transmitting, storing and/or interpreting electroencephalography signals obtained from one or more sensors incorporated into bands. In some embodiments, being placed on the surface of the scalp, the illustrative inventive electroencephalography device of the present disclosure may read the electrical activity on the scalp, representing the macroscopic activity of the surface layer of the brain. In some embodiments, the exemplary movable band may enable reading the signals from multiple scalp points. The registered EEG signals and/or at least partially processed data may be transmitted wirelessly and/or via a wired connection to at least one electronic computing device (e.g., smartphone, tablet, laptop, remote server, etc.). In some embodiments, the results of EEG sensor data processing and/or their interpretation may be shown to users.

In the present disclosure, the terms "wearable mobile electroencephalography device", "mobile electroencephalography device", "wearable electroencephalography device", "wearable mobile EEG device", "mobile EEG device", "wearable EEG device" are used interchangeably.

In some embodiments, the illustrative inventive wearable EEG device may be operated such as to obtain EEG signals from any combination of points (e.g., electrode locations) of the surface of the scalp in accordance with the International 10-20 system, as shown in FIG. 1. In some embodiments, the illustrative inventive mobile electroencephalography device may be connected wirelessly to one or more electronic computing devices in order to process and/or interpret the EEG signals and/or EEG data.

BRIEF DESCRIPTION OF THE DRAWINGS

Various embodiments of the present disclosure can be further explained with reference to the attached drawings, wherein like structures are referred to by like numerals throughout the several views. The drawings shown are not necessarily to scale, with emphasis instead generally being placed upon illustrating the principles of the present disclosure. Therefore, specific structural and functional details disclosed herein are not to be interpreted as limiting, but merely as a representative basis for teaching one skilled in the art to variously employ one or more illustrative embodiments.

DETAILED DESCRIPTION

Figure 1:
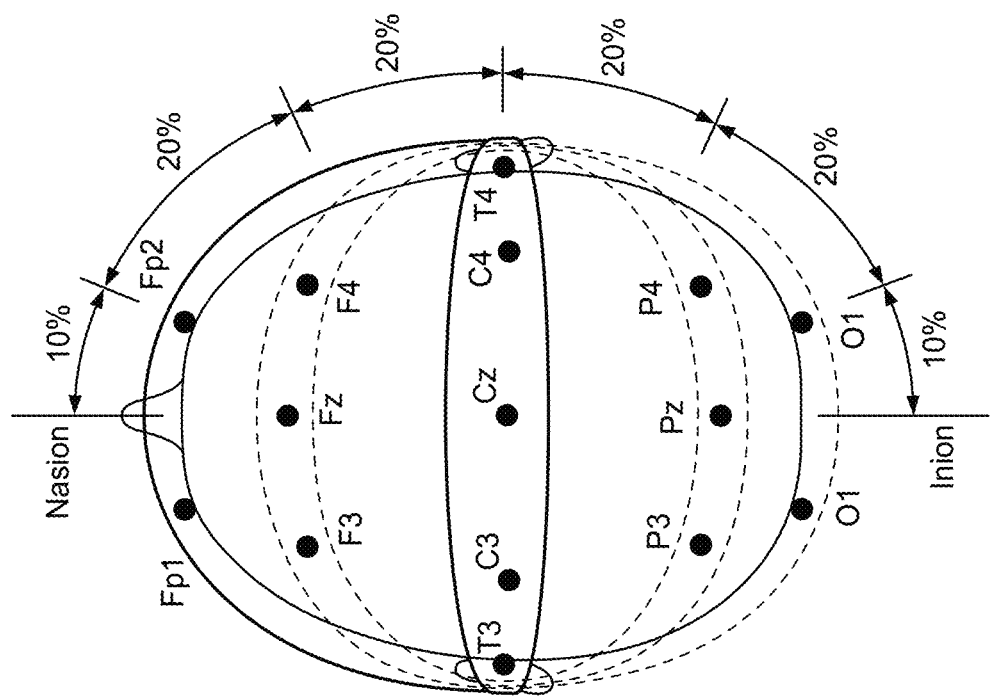
FIG. 1 illustrates an exemplary placement of the inventive EEG device on the surface of the scalp at exemplary electrode locations according to the International 10-20 system in accordance with some embodiments of the present disclosure.
Figure 1:
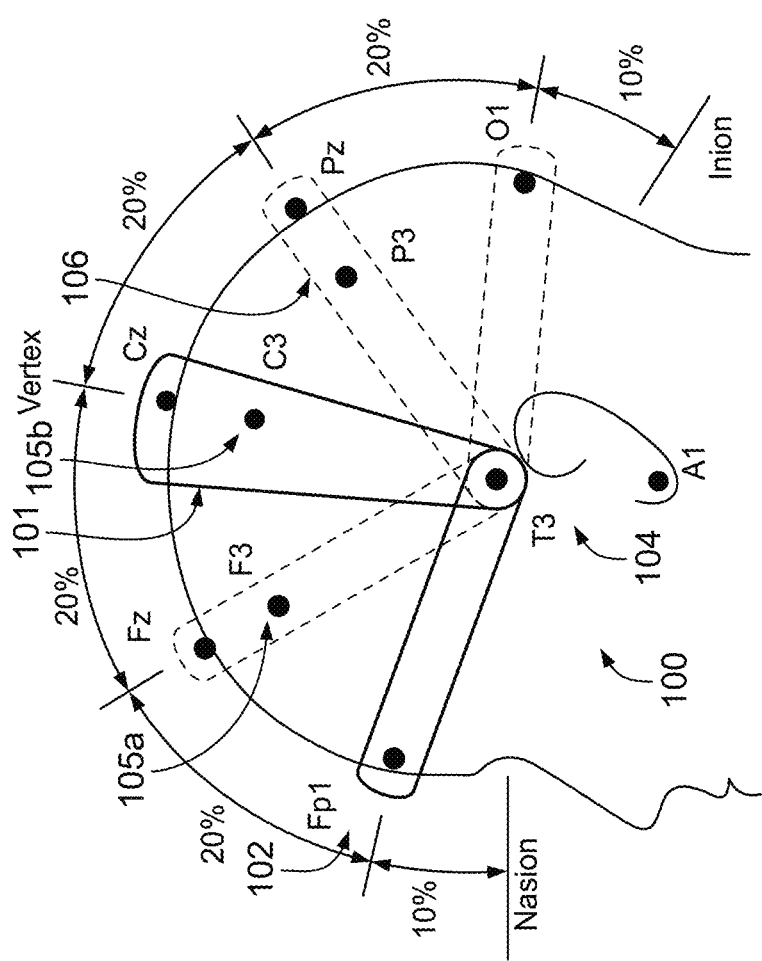

In some embodiments, as shown for example in FIG. 1, the illustrative inventive wearable EEG device may be placed on the surface of the scalp. The illustrative inventive wearable EEG device 100 of FIG. 1 may include a main band 101 and a movable band 102. While FIG. 1 depicts one main band 101 and one movable band 102, there may be more than one main band 101 and/or more than one movable band 102. For example, the main band 101 and/or the movable band 102 may be separated in separate band segments having different electrodes mounted thereon.

In some embodiments, the main band 101 may include a band configured to be fixed relative to a head of a wearer.

For example, the main band 101 may include a headband attached to ear cups that cover each of the wearer's ears. The main band 101 and/or the ear cups may serve to hold the EEG device 100 in place on the wearer's head.

In some embodiments, the movable band 102 may be adjustable to moveably locate electrodes mounted to the movable band 102 to sites associated with locations on the wearer's head. The movable band 102 may rotate relative to the ear cups to sweep the electrodes across a front and/or back of the wearer's head to position the electrodes at the associated locations.

In some embodiments, the ear cups may include speakers configured to play audio stored on the EEG device and/or provided by an external computing device in communication with the EEG device. For example, multi-media and/or instructions to the wearer may be provided to the EEG device so as to elicit behaviors and/or responses by the brain of the wearer. The speakers may be used to play the audio portion of the multi-media such that the EEG sensors may measure EEG measurements in response to the multi-media, thus measuring the effects of the multi-media on the behavior of the brain of the wearer.

In some embodiments, the illustrative wearable EEG device 100 may include passive and/or active electrodes. In some embodiments, at least two reference electrodes may be positioned on the main band and at least two reference electrodes may be placed on the movable band, e.g., "fixed" electrodes and "moveable" electrodes respectively. In such embodiments, the two electrodes on the main band may be placed in such a way that the fixed electrodes cover zones of the brain and/or scalp useable for neurofeedback, e.g., according to the 10-20 system. For example, in some embodiments, the fixed electrodes may be positioned to cover zones C3-C4 (FIG. 1) or other zones, such as T3-T4, among others or any combination thereof. The two electrodes on the movable band may be placed in such a way that the moveable electrodes cover zones for neurofeedback training. Using the moveable electrodes on the moveable band to cover the neurofeedback training zones allows for sequential targeting of the neurofeedback training zones, e.g., throughout a session of neurofeedback training. In some embodiments, different positions may target different brain regions, and so too may different neurofeedback protocols target different brain regions, where a neurofeedback protocol refers to a regimen or routine of activities to be performed by a patient for which neurological measurements may be acquired via the EEG device. For example, in some embodiments, the moveable electrodes may be positioned to cover zones FP1-FP2 (FIG. 1) or other zones, such as F3, P3, O3, F4, P4, and/or O4, among others or any combination thereof. In some embodiments, illustrative inventive wearable electroencephalography device 201 may have one, two, three, four, five, six, seven, eight, nine, ten or more electrodes on the main band (e.g., band 101). For example, where there are four fixed electrodes, the four fixed electrodes may be placed in such a way that the four fixed electrodes cover zones C3-C4 or/and T3-T4. Thus, in some embodiments, the electrodes in the aggregate may produce a set of EEG measurements associated with the respective zones, where the main band measures a first subset within the set of EEG measurements, and the moveable band measures a second subset within the set of EEG measurements.

In some embodiments, the movable band 102 may be attached to the main band 101 at least at one end of the movable band 102. In some embodiments, the movable band 102 may be attached by at least one joint mechanism that allows placing the movable band 102 in different locations of the user's scalp 106. As shown in FIG. 1, for example, the movable band 102 may be placed in at least two positions on the scalp of the user at different times. In some embodiments, the positions may be associated with the brain regions for which a particular neurofeedback protocol is design to target. Thus, as the neurofeedback protocol is performed, the moveable band 102 may be repositioned in order to adjust the positions of the electrodes, thus shifting the focus of the neurofeedback training and measurement thereof to different brain regions. As a result, the moveable band 102 may be employed to adapt the EEG device to the specific goals of any one or more different neurofeedback protocols to better conduct neurofeedback therapy. In some embodiments, at least one electrode 105a may be disposed inwardly (positioned toward the scalp 106) along the movable band 102. In some embodiments, at least one electrode 105b may be additionally disposed inwardly (positioned toward the scalp 106) along the main band 101. Accordingly, in some embodiments, the at least one electrode 105a and the at least one electrode 105b may be adjusted to accommodate different head sizes and/or shapes, as well as to target different zones.

Figure 2:
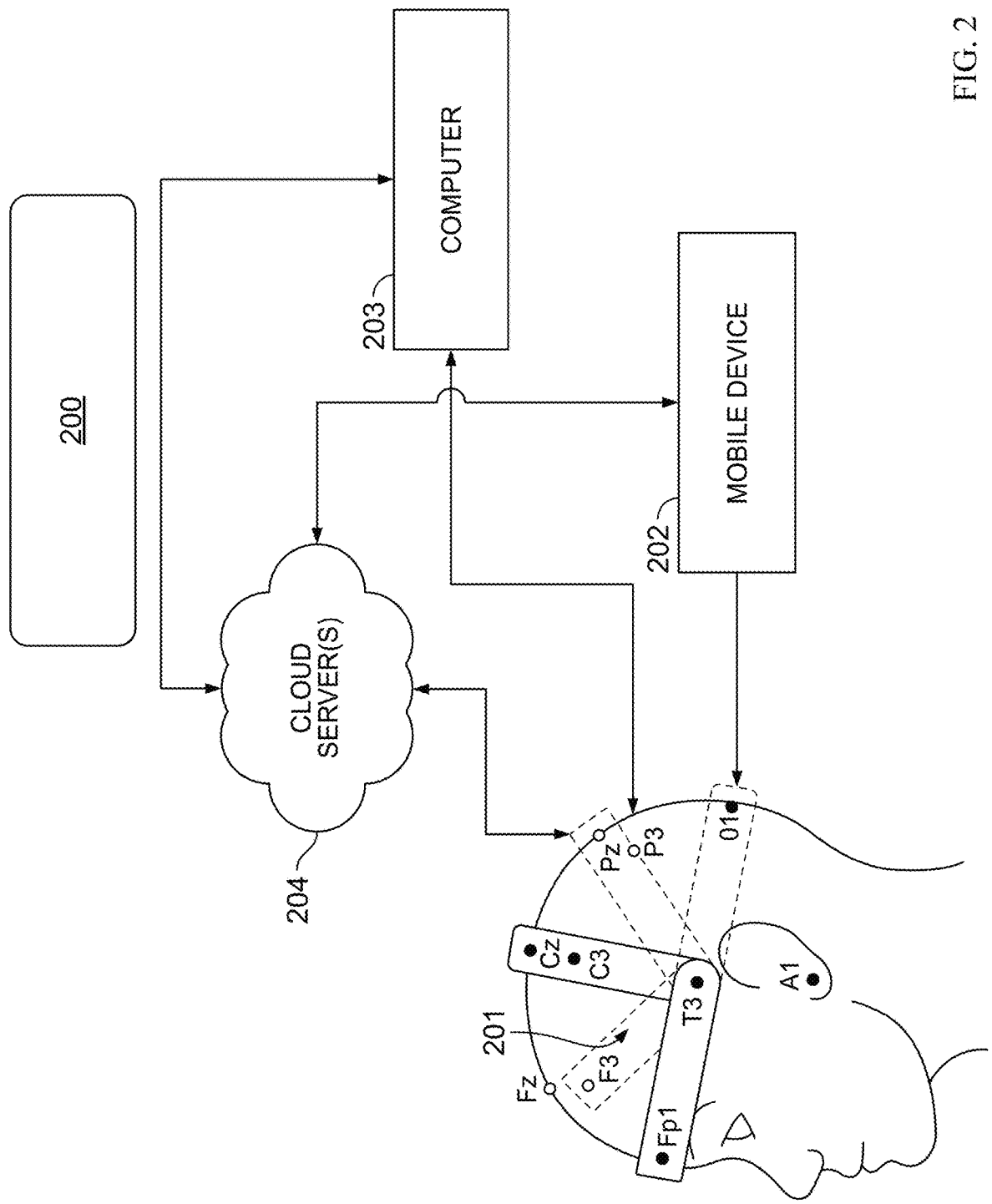
FIG. 2 illustrates the exemplary scheme of hardware in accordance with one or more embodiments of the present disclosure.

FIG. 2 illustrates an exemplary hardware configuration 200 of an illustrative inventive system in accordance with at least some embodiments of the present disclosure. As it shown in FIG. 2, an illustrative inventive wearable EEG device 201 may be connected to at least some of the following: (1) a mobile computing device 202, which may be a smartphone, tablet, portable computing device, or a combination of such devices, or similar; (2) a computing device 203, which may be a laptop, a stationary computer, plurality of laptops and/or stationary computers; (3) one or several servers 204. In some embodiments of the present disclosure, the computing devices 202, 203 may be connected with the server 204 via wireless or/and wired connections. In some embodiments of the present disclosure, the illustrative inventive wearable EEG device 201 may be connected with the computing device 202 and/or computing device 203 via wireless or/and wired connections.

For example, sensory data (e.g., EEG signals) collected by the illustrative inventive wearable EEG device 201 may be transmitted to the mobile computing device (202) and/or the computing device 203 wirelessly via Bluetooth and/or Wi-Fi communications. In some embodiments, may be processed by a microcontroller unit of the illustrative wearable electroencephalography device 201 or/and by the mobile computing device (202), and/or the computing device 203. In some embodiments, at least a portion the sensory data (e.g., EEG signals, processed EEG data) may be transmitted by the illustrative wearable electroencephalography device 201 wirelessly (e.g., via WiFi, Bluetooth, etc.) to the server 204. In some embodiments, the server 204 may transmit back the results of computations and/or data processing to the device(s) 202 and/or the device 203. In some embodiments, the computations and/or data processing may include any one or more of, without limitation, quantitative analysis, spectral analysis, event-related potential (ERP) analysis, coherence analysis, and brain mapping techniques. For example, quantitative analysis measures EEG parameters including, e.g., amplitude, frequency, and duration of brainwave patterns to quantify brain activity.

In some embodiments, movable band(s) (e.g., the exemplary movable band 102 (shown in FIG. 1)) with electrode(s) is configured to be moved and placed on different positions on the scalp so as to allow to measure brain signals from different locations with a limited number of electrode(s). In some embodiments, the EEG device 100 may be used to perform a course of measurements, e.g., while the wearer is performing an activity, such as playing a game, meditating, solving a puzzle, looking at pictures, etc. Depending on the activity and/or the neurological response being assessed, the moveable band(s) may be positioned in one or more positions during the course of measurement. For example, movable band(s) (e.g., the exemplary movable band 102 (shown in FIG. 1)) may be positioned, sequentially, on the frontal lobe, parietal and occipital regions during a course of measurement.

In some embodiments, movable band(s) may be placed at the standard electrode location points according to the International 10-20 system (shown in FIG. 1). For example, when a user, who wants to measure the brain signals from a frontal lobe, could wear the illustrative mobile electroencephalography device (e.g., 100, 301) and adjust movable band (e.g., the exemplary movable band 102 (shown in FIG. 1)) so as to position the electrodes of the moveable band (e.g., "moveable" EEG electrodes) to the frontal position. Further, when the user wants to measure EEG signals from the parietal lobe, the user may be suggested to move the movable band to the parietal position. Indeed, in some embodiments, the user may have a particular need, concern, brain exercise, neurofeedback protocol, among other uses for neurofeedback from the EEG device. The use may be associated with a particular zone or set of zones for measuring neurological activity in one or more associated brain regions. For example, if a user is experiencing issues with attention and focus, they might want to measure the activity in the frontal regions of the brain responsible for executive functions. Alternatively, if someone is dealing with emotional regulation problems, they may want to measure the activity in regions associated with emotions, such as the amygdala. Understanding the activity in specific brain regions can help tailor neurofeedback training to address the user's unique challenges. The moveable band provides for adjusting the position of the moveable EEG electrodes, either during a routine or regimen of activities in a neurofeedback training session, or before or after the session, or any combination thereof.

In some embodiments of the present disclosure, for example, without limitation, any device of devices 201-204 may utilize one or more data transform techniques, such as but not limiting to, Fast Fourier Transform, Digital Fourier Transform, and other similar signal processing algorithm(s) and/or digital filters for processing signals transmitted from the illustrative wearable electroencephalography device 201. In some embodiments, signal processing algorithm(s) and/or digital filters may be implemented on any one or more of the EEG device 201, mobile device 202, computer 203 and/or cloud server(s) 204, in any combination thereof. In some embodiments, examples of the signal processing results may be: raw EEG digital data, power bands of the raw EEG data, etc. In some embodiments, the server 304 may be configured to transmit output data of obtained processed EEG signals to specialists (e.g., health care professional(s), care giver(s), etc.) and/or to artificial intelligence algorithm(s) as disclosed further.

In some embodiments, exemplary inventive system of the present disclosure may be configured (e.g., as shown in FIG. 2) to operate in the distributed network environment, communicating with one another over one or more suitable data communication networks (e.g., the Internet, satellite, etc.) and utilizing one or more suitable data communication protocols/modes such as, without limitation, IPX/SPX, X.25, AX.25, AppleTalk™, TCP/IP (e.g., HTTP), near-field wireless communication (NFC), RFID, Narrow Band Internet of Things (NBIOT), 3G, 4G, 5G, GSM, GPRS, WiFi, WiMax, CDMA, satellite, ZigBee, and other suitable communication modes.

In some embodiments, at least one artificial intelligence algorithm may be utilized to process sensor EEG data, collected by the illustrative inventive wearable electroencephalography device 201. In some embodiments, the exemplary server 204 may be configured to utilize at least one artificial intelligence algorithm to process sensor EGG data and then may transmit results to mobile device 202 and/or computing device 203. In some embodiments, the at least one machine learning algorithm may be a neural network such as, but limited to, employed to process the sensor EEG data in Tenev et al., *International Journal of Psychophysiology*, 93 (2014) 162-166. For example, an illustrative neural network may be configured to process the sensor EEG data based at least in part on a routine of actions performed by the wearer. The routine of actions provides controllable stimulus so as to ensure the reliability and reduced noise of EEG measurements collected during the routine. In some embodiments, the routine may include a series of actions to emulate a resting condition and an active condition of the wearer, where the active condition includes the wearer engaging in a mental exercise during EEG measurement, such as a game, a test, a puzzle, a video and/or audio playback, or other mental exercise or any combination thereof. In some embodiments, the resting condition may include the wearer not engaging in the mental exercise during EEG measurement. An example routine including resting and active conditions may include, e.g., 5 minutes of eyes closed (resting condition); 5 minutes of eyes opened (resting condition); visual continuous performance test with 20 minutes duration; emotional continuous performance test with 20 minutes duration.

In some embodiments, the measurements collected during the routine may be used as features for input to the artificial intelligence algorithm. In some embodiments, the features may be extracted from the EEG measurements to produce one or more statistical measures characterizing the measurements. Such statistical measures may include, without limitation, mean, median, variance, and skewness from EEG signal segments, among others or any combination thereof. In some embodiments, the features may also or alternatively include, without limitation, calculations of power spectral density and/or band power so as to analyze the distribution of different frequency components in the EEG data, among other techniques or any combination thereof.

In some embodiments, the artificial intelligence algorithm may be configured to use the features as input to solve for regression or classification problem so as to output a prediction of a user condition and/or state, such as a neurological condition or disorder, a mental health state, a stress level, among other conditions/states or any combination thereof. For example, without limitations, the suitable machine learning algorithm may be in the form of linear regression, decision trees, random forests, boosted trees, neural networks. Such algorithms may be trained using one or more medical dataset, having data corresponding to a particular disorder, such as, without limitations, accessible attention deficit hyperactivity disorder (ADHD). For example, in some embodiments, an exemplary dataset may include measurement(s) for people who do not have the ADHD. After training, the model may be used for the ADHD prediction (either as a probability, or "YES/NO" output). For example, in some embodiments, an exemplary dataset may be used for the autism spectrum disorder (ASD) prediction. In some embodiments, extracted features for prediction ADHD may be such as but not limiting to, power spectral features, non-linear power spectral features. In some embodiments, extracted features for prediction ASD may be such as but not limiting to, power spectral features, coherence features.

In some embodiments, to train the machine learning algorithm, training data may be provided for input to the machine learning algorithm, where the training data includes sets of EEG measurements, where each set is paired with a known patient condition and/or state associated with the set. Each set of EEG measurements may include EEG measurements from one or more zones according to the 10-20 system for EEG measurement, where the EEG measurements correspond to a particular resting and/or active condition of the wearer, and/or a routine of resting and/or active conditions.

In some embodiments, each set of EEG measurements in the training data may be provided to the machine learning algorithm, e.g., encoded in a feature vector, to produce a predicted output value. Using each set of EEG measurements in the training data as input, the machine learning algorithm may produce a predicted output indicative of a presence, absence and/or classification of a patient condition and/or state. In some embodiments, an optimizer associated with the machine learning algorithm may then compare the predicted output (e.g., a predicted patient condition and/or state) with the known patient condition and/or state associated with each set of EEG measurements in the training data. Based on the known patient condition and/or state, the optimizer may determine an error of the predicted output for a given set of EEG measurements. In some embodiments, the optimizer may employ a loss function, such as, e.g., Hinge Loss, Multi-class SVM Loss, Cross Entropy Loss, Negative Log Likelihood, or other suitable classification loss function to determine the error of the predicted output value based on the known output.

In some embodiments, based on the error, the optimizer may update the parameters of the machine learning algorithm using a suitable training algorithm such as, e.g., backpropagation for a prediction machine learning model. In some embodiments, backpropagation may include any suitable minimization algorithm such as a gradient method of the loss function with respect to the weights of the prediction machine learning model. Examples of suitable gradient methods include, e.g., stochastic gradient descent, batch gradient descent, mini-batch gradient descent, or other suitable gradient descent technique. As a result, the optimizer may update the parameters of the machine learning algorithm based on the error of predicted output in order to train the machine learning algorithm to model the correlation between a set of EEG measurements and the condition and/or state of the wearer.

In some embodiments and, optionally, in combination of any embodiment described above or below, an exemplary implementation of Neural Network may be executed as follows:
  i) Define Neural Network architecture/model,
  ii) Transfer the input data to the exemplary neural network model,
  iii) Train the exemplary model incrementally,
  iv) determine the accuracy for a specific number of timesteps,
  v) apply the exemplary trained model to process the newly-received input data,
  vi) optionally and in parallel, continue to train the exemplary trained model with a predetermined periodicity.

In some embodiments and, optionally, in combination of any embodiment described above or below, the exemplary trained neural network model may specify a neural network by at least a neural network topology, a series of activation functions, and connection weights. For example, the topology of a neural network may include a configuration of nodes of the neural network and connections between such nodes. In some embodiments and, optionally, in combination of any embodiment described above or below, the exemplary trained neural network model may also be specified to include other parameters, including but not limited to, bias values/functions and/or aggregation functions. For example, an activation function of a node may be a step function, sine function, continuous or piecewise linear function, sigmoid function, hyperbolic tangent function, or other type of mathematical function that represents a threshold at which the node is activated. In some embodiments and, optionally, in combination of any embodiment described above or below, the exemplary aggregation function may be a mathematical function that combines (e.g., sum, product, etc.) input signals to the node. In some embodiments and, optionally, in combination of any embodiment described above or below, an output of the exemplary aggregation function may be used as input to the exemplary activation function. In some embodiments and, optionally, in combination of any embodiment described above or below, the bias may be a constant value or function that may be used by the aggregation function and/or the activation function to make the node more or less likely to be activated.

In some embodiments, illustrative inventive wearable electroencephalography device 201 may have two movable bands (e.g., band 102) that may configured such the moving bands would rotate to cover respective forehead parts (e.g., for the points Fp1 and Fp2, F3 and F4, P3 and P4, O1 and O2). In some embodiments, the movable bands may rotate independently from each other to, for example, reach Fp1 and O2 points simultaneously.

In some embodiments, electrodes may be configured to be implemented on the main band and/or movable band such that there is at least one reference electrode, at least one ground electrode and at least two active electrodes. In some embodiments, the ground and/or reference electrode(s) may be positioned on the EEG device in a position that corresponds to a location on the head that exhibits a minimum of brain activity measurements. For example, a location behind the ears exhibits minimal brain activity signals relative to other locations on the head that are feasible for positioning an electrode. Accordingly, in one or more embodiments, the ground and/or reference electrode(s) may be positioned on the EEG device in a position that corresponds to behind the ears of the user, such as, e.g., on, in or around the ear cups of the EEG device.

In some embodiments, the at least two active electrodes may be positioned on the EEG device so as contact the head of the wear in a zone that measures EEG measurements for at least one brain regions of interest. As detailed above, one or more of the active electrodes may be positioned on the moveable band while one or more other electrodes may be positioned on the fixed band. Thus, the at least two active electrodes may measure brain activity in at least two brain regions based on the positioning of the active electrodes on the EEG device. In some embodiments, there may be 2, 3, 4, 5, 6, 7, 8, 9, 10, 11, 12 or more active electrodes in a configuration.

For example, the following configurations of the electrodes may be implemented across the main band (e.g., band 101) and the movable band (e.g., band 102):
  (1) an arrangement having 4 channels (2 active electrodes, 1 reference electrode, 1 ground electrode);

(2) an arrangement having 5 channels (3 active electrodes, 1 reference electrode, 1 ground electrode);
(3) an arrangement having 6 channels: 4 active electrodes, 1 reference electrode, and 1 ground electrode;
(4) an arrangement having 7 channels: 5 active electrodes, 1 reference electrode, 1 ground electrode;
(5) an arrangement having 8 channels (6 active electrodes, 1 reference electrode, 1 ground electrode);
(6) an arrangement having 9 channels (7 active electrodes, 1 reference electrode, 1 ground electrode);
(7) an arrangement having 10 channels (8 active electrodes, 1 reference electrode, 1 ground electrode);
(8) an arrangement having 11 channels (9 active electrodes, 1 reference electrode, 1 ground electrode);
(9) an arrangement having 12 channels (10 active electrodes, 1 reference electrode, 1 ground electrode).

In other embodiments, other configurations of electrodes may be similar suitable.

Figure 3:
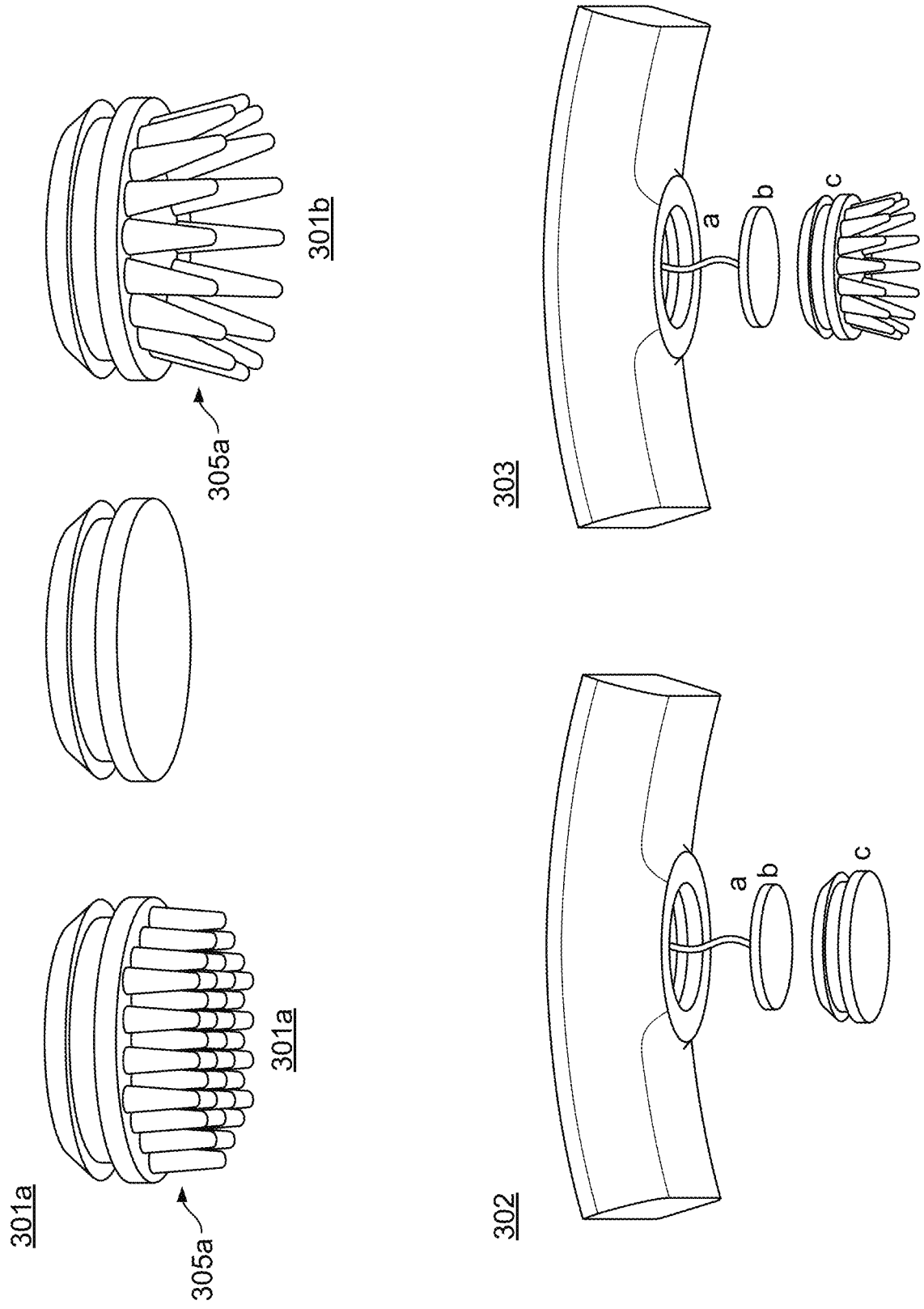
FIG. 3 illustrates exemplary types of electrodes and their possible connection to an illustrative inventive EEG device in accordance with one or more embodiments of the present disclosure.

In some embodiments, the active dry electrodes may be utilized in illustrative inventive wearable EEG devices 100 and/or 201. In some embodiments, electrodes may be position within spikes that may be made of polymer electrically conductive material. In some embodiments, nozzles may be removable so that they can be easily changed. In some embodiments, the exemplary types of electrodes (301) and exemplary connection schemes (302-303) are illustrated in FIG. 3. As it shown in 302 and 303, a typical sensor may include connecting wire(s) (a), a cavity with a chip (b), and a lid (c). In some embodiments, the element (b) may be covered with immersion gold from one side and the chip may be connected to the other side. In some embodiments, the lid (c) may be made of, without limitation, semi-conductive/dissipative material based on polyurethane. The example of such semi-conductive/dissipative material may be LATIOHM 92-02 PD09 BLACK: 3302F3, which may have, without limitations, the following physical characteristics: density=1.35 g/cm3; tensile elongation (speed 5 mm/min, at break)>100%; elastic modulus (tensile, speed 1 mm/min)=90 MPa; electrical resistivity (surface) in the range (1.0.101-1.0.104)^m. This material may be suitable for its electrical characteristics as being conductive with a low resistance.

In some embodiments, the lid (c) may have spikes 305 as shown in lid assembly (301a) and lid assembly (301b). Spikes 305 provide a contact with the surface of the head (scalp) through human hair. In some embodiments, the length and/or width of spikes 305 may be personalized to fit through people's hair. In some embodiments, the length of spikes 305 may be in the range 3-10 mm. In some embodiments, the length of spikes (305a and 305b) may be in the range 1-10 mm. In some embodiments, the length of spikes (305a and 305b) may be in the range 3-15 mm. In some embodiments, the length of spikes 305 may be in the range 5-10 mm. In some embodiments, the width of spikes (305a and 305b) may be in the range 1-3 mm. In some embodiments, the width of spikes (305a and 305b) may be in the range 1-5 mm. In some embodiments, the width of spikes (305a and 305b) may be in the range 2-5 mm. In some embodiments, the width of spikes (305a and 305b) may be in the range 0.1-5 mm. In some embodiments, the width of spikes (305a and 305b) may be in the range 0.5-3 mm.

In some embodiments, exemplary dry EEG sensors may be sensors that are produced by Conscious Labs SAS (Paris, France) and/or FOC.US (Brian Control Co. Ltd, London, UK) or other dry EEG sensors or any combination thereof. In some embodiments, the dry EEG sensors may include a first set of sensors on the main band which are configured to remain in place once the EEG device is positioned on the head. Such first set of sensors may be "fixed" dry EEG sensors. In some embodiments, the dry EEG sensors may include a second set of sensors on the moveable band which are configured to be repositionable via adjusting the position of the moveable band after the EEG device is positioned on the head. Such second set of sensors may be "moveable" dry EEG sensors.

Figure 4:
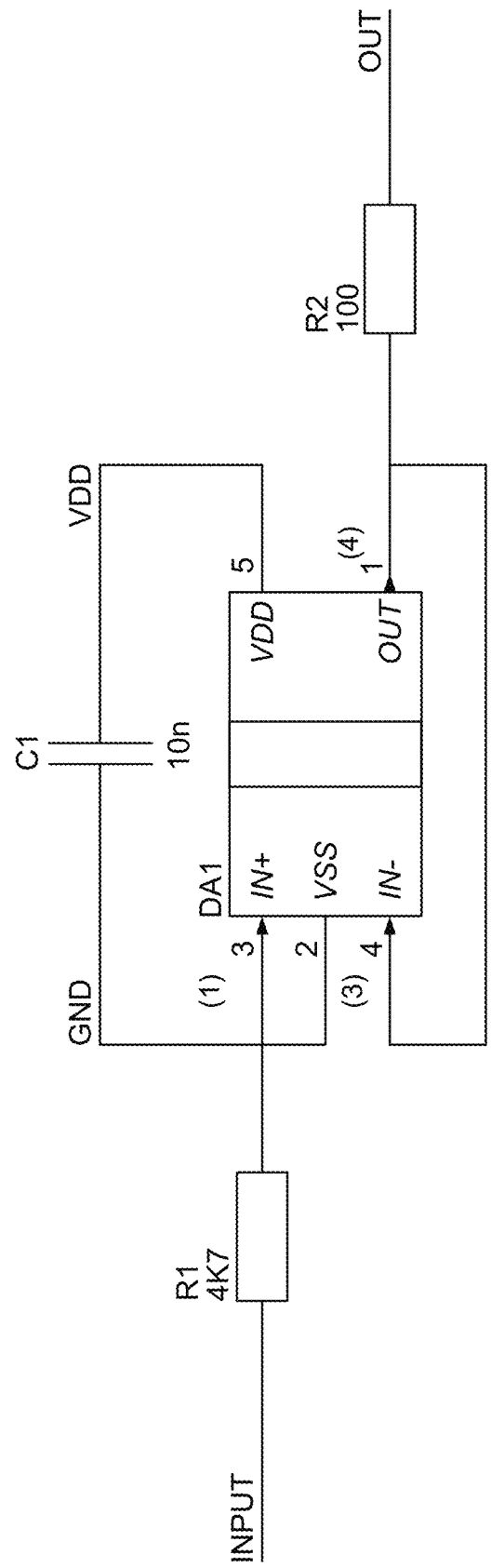
FIG. 4 illustrates an exemplary computer chip circuitry of an illustrative EEG device sensor in accordance with one or more embodiments of the present disclosure.

In some embodiments, the exemplary chip 302 (b)/303 (b) may have a chip circuitry shown in FIG. 4. The chip circuitry illustrated in FIG. 4 may form an operational amplifier which operates as a signal repeater. The signal is read from the silicone cap (302 (c)/303 (c) of FIG. 3 and can be transmitted through the exemplary chip 302 (b)/303 (b), as the repeater, to an analog-to-digital converter (ADC). In some embodiments, when transmitted through the exemplary chip 302 (b)/303 (b) (the repeater), the signal is amplified, reducing the probability of noise and interference when the signal passes through the wires. In some embodiments, the operational amplifier may correspond to a particular chip 302 (b)/303 (b) such that a particular electrode includes an operational amplifier dedicated to processing the signal from the particular electrode. In some embodiments, the chip 302 (b)/303 (b) and/or the operational amplifier thereof may be in communication with one or more electrodes to process the signal of each electrode in a shared operational amplifier.

Figure 5:
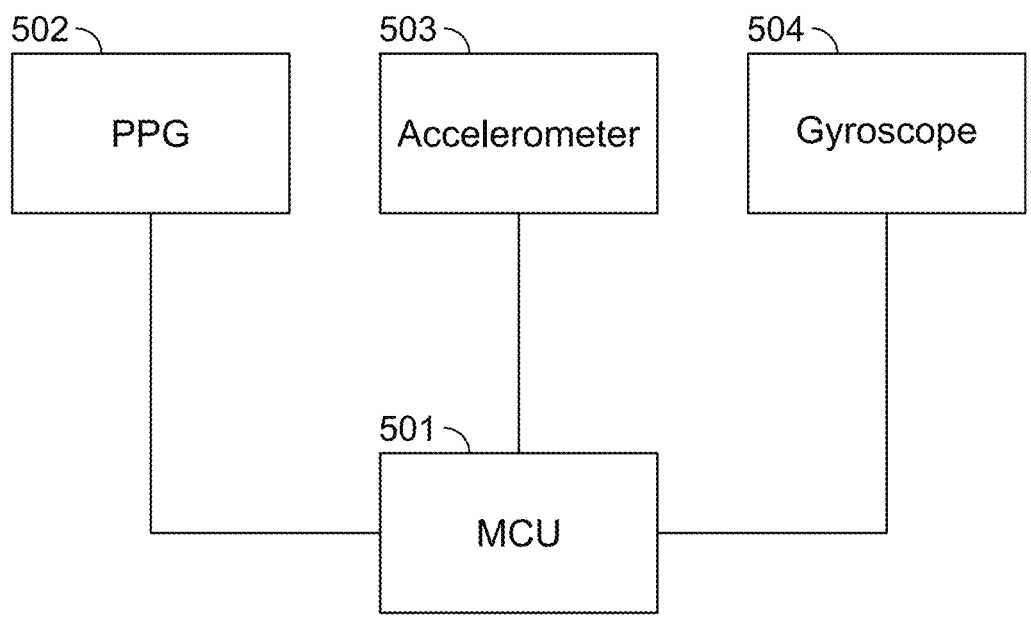
FIG. 5 illustrates an exemplary connection scheme of exemplary sensors that may be utilized in an illustrative EEG device in accordance with one or more embodiments of the present disclosure.

In some embodiments, various inventive systems of the present disclosure may include one or more inertial and/or other type of sensors in addition to the EEG data measurements. As shown in FIG. 5, in some embodiments, additional sensors may be one or more of a photoplethysmogram (PPG, 502) sensor, accelerometer 503, or gyroscope 504. For example, the PPG sensor(s) may be used for measuring oxygen level of blood of the wearer, which may be reported in addition to the EEG data measurements as part of a measurement signal. Thus, the oxygen level may be correlated to the EEG data measurements as an additional feature for assessing the mental condition and/or state of the user In some embodiments, accelerometer(s) and/or gyroscope (s) may be utilized to detect the position of the user's head, which may be reported in addition to the EEG data measurements as part of the measurement signal. In some embodiments, the EEG device may receive audio data from an external computing device, the audio data directing the wearer to perform a movement. The accelerometer(s) and/or gyroscope(s) may be utilized to detect performance of the movement based on the position of the user's head. Alternatively or additionally, the position of the user's head may be correlated to the EEG data measurements as an additional feature for assessing the mental condition and/or state of the user.

In some embodiments, one or more of additional sensors may be incorporated within the illustrative inventive EEG device (e.g., 100, 201). The exemplary connection circuitry of additional sensors is shown in FIG. 5. As shown in FIG. 5, in some embodiments, sensors may be connected to the microcontroller (MCU, 501). The example of such a MCU may be the ESP32 (ESPRESSIF SYSTEMS (SHANGHAI) CO., LTD)—a microcontroller with integrated Wi-Fi and dual-mode Bluetooth. In some embodiments, other sensors may also be connected to the MCU, for example, accelerometer (503), gyroscope (504). Some other sensors may be used as well, such as magnetometer. In some embodiments, any of the above-mentioned sensors may or may not be used in any combination. In some embodiments, systems of the present disclosure may utilize sensors that may be designed for various purposes, including, but not limiting, the recognition of different diseases, such as detailed, without limitation, in Ponciano et al., Identification of Diseases Based on the Use of Inertial Sensors: A Systematic Review, *Electronics* 2020, 9(5), 778 (https://doi.org/10.3390/electronics9050778), which is herein incorporated by reference in its entirety. For example, accelerometer signals may be used to detect the Parkinson's disease.

Figure 6:
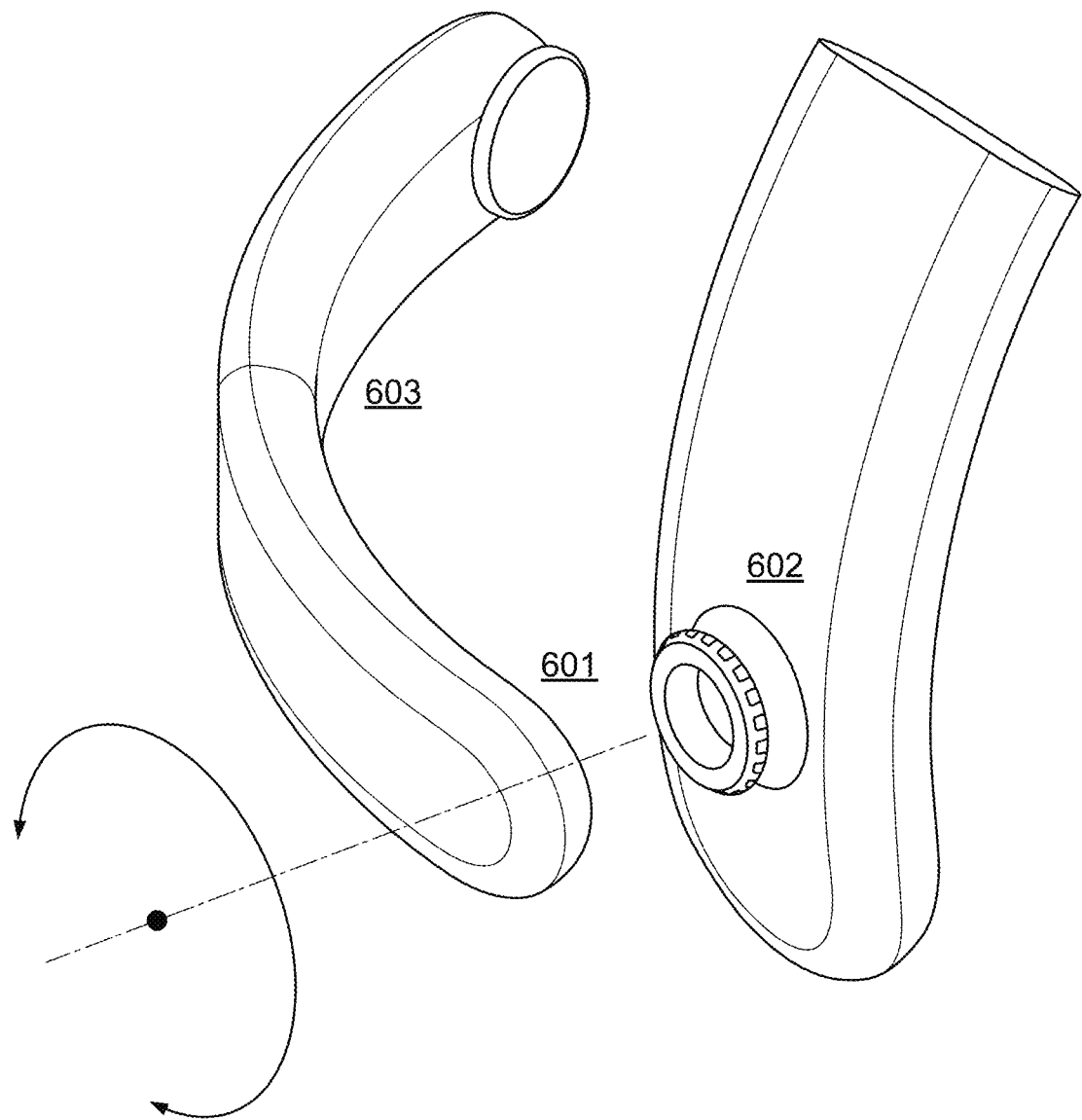
FIG. 6 illustrates an exemplary joint of an illustrative inventive movable band in accordance with one or more embodiments of the present disclosure.

FIG. 6 illustrates an exemplary joint to connect an exemplary movable band (e.g., 102) to an exemplary main band (e.g., 101). In some embodiments, the exemplary connection may be a cylindrical joint (e.g., pin joint, revolute joint, or other similarly suitable) between movable and fixed parts. As it shown in FIG. 6, a cylindrical joint 601 may be attached to a main (stationary) part of an illustrative inventive EEG device 602 and links the main part to a movable part 603 allowing the movable part 603 to rotate in one degree of freedom. In some embodiments, a ball joint may be used instead of the cylindrical joint.

Figure 7:
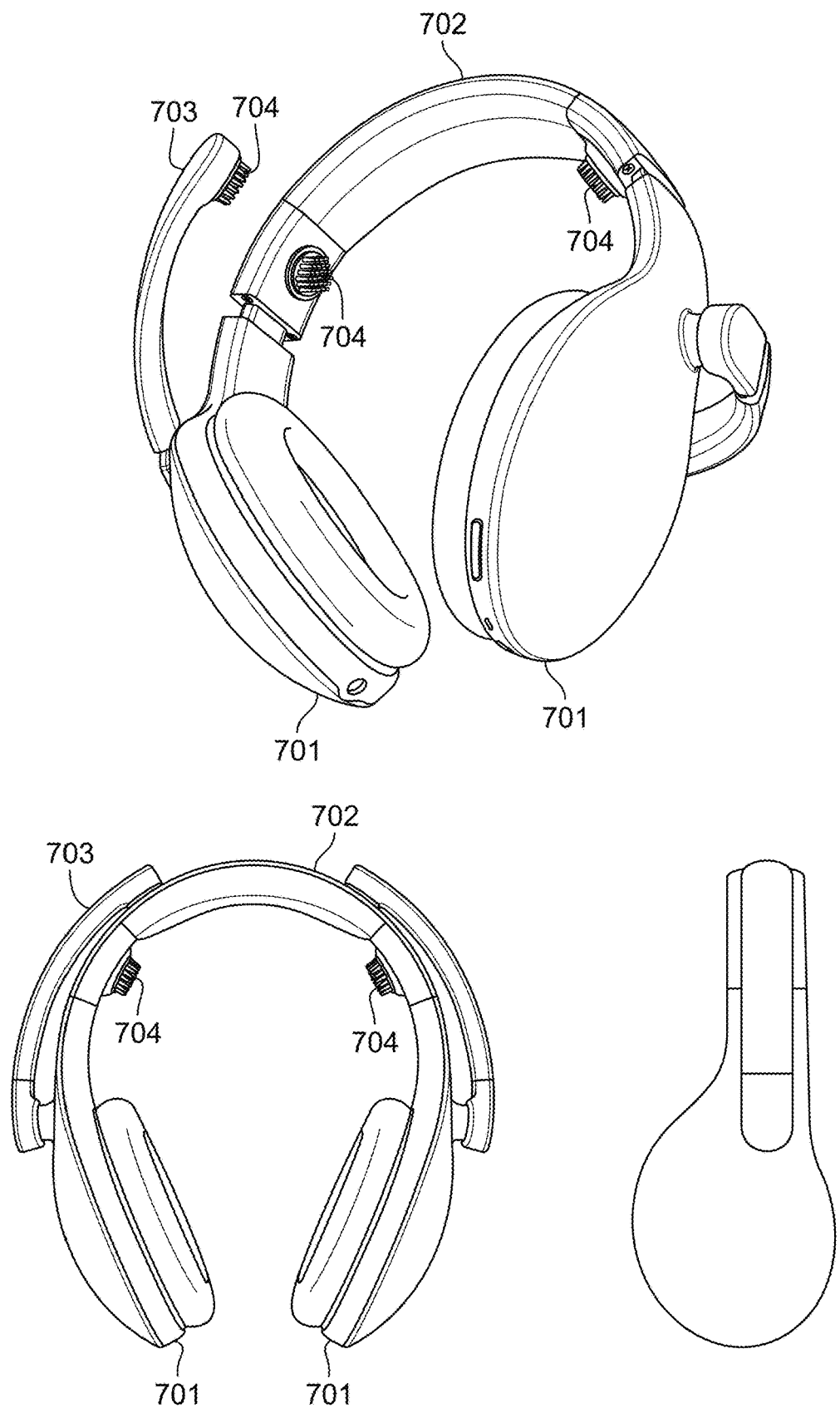
FIG. 7 illustrates the exemplary embodiments of a mobile EEG device in accordance with one or more embodiments of the present disclosure.

FIG. 7 illustrates the exemplary embodiments of the inventive mobile EEG device. As it is shown in FIG. 7, the inventive EEG device may include headphones 701, the main band 702, the movable band 703 and the sensors 704, including "fixed" sensor on the main band 702 and "moveable" sensors on the moveable band 703. The detailed description of each part is given above.

Figure 8:
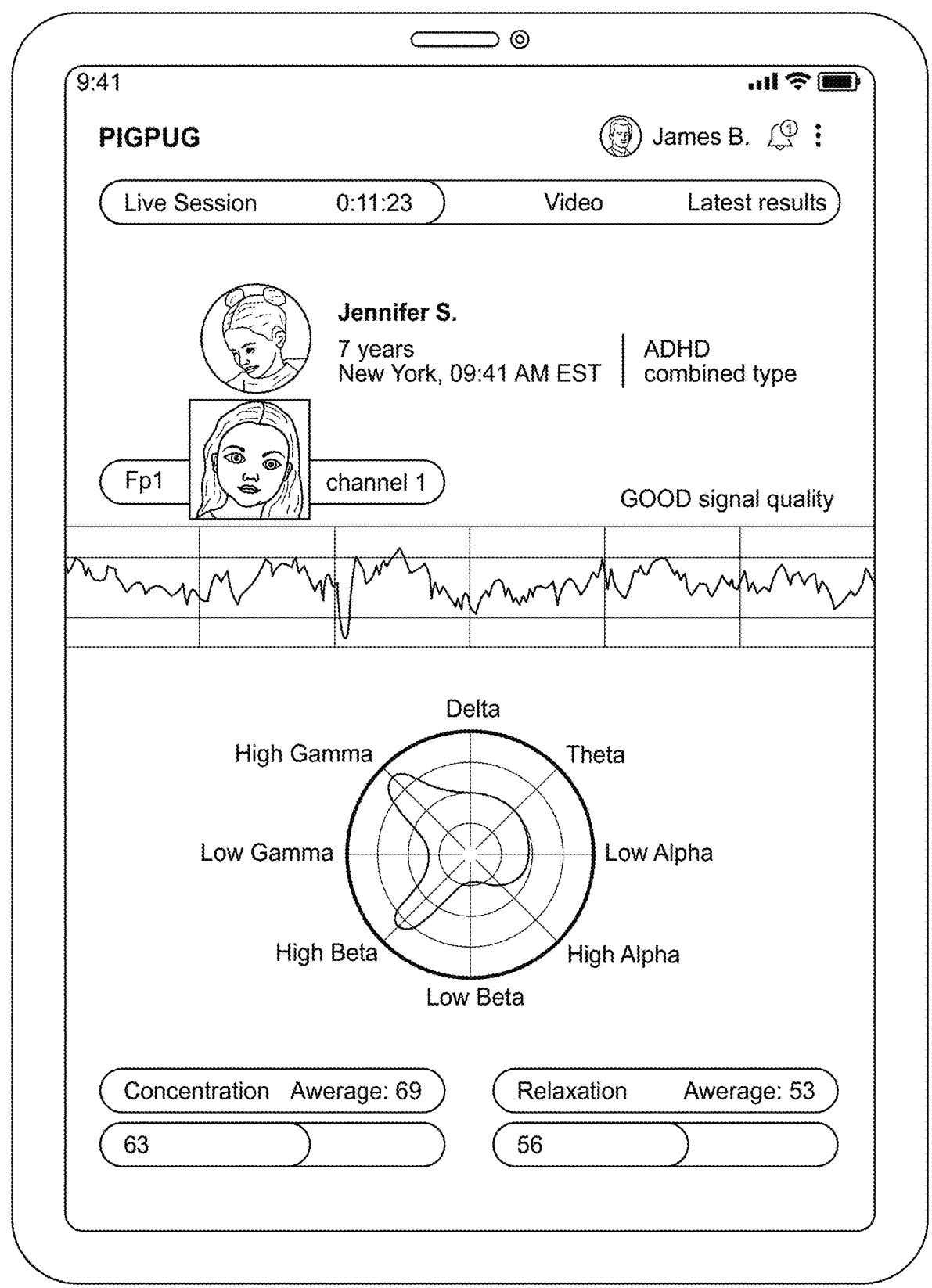
FIG. 8 illustrates the exemplary user interface 802 of a software associated with the mobile EEG device shown in FIG. 7 in accordance with one or more embodiments of the present disclosure.

FIG. 8 illustrates the exemplary user interface 802 of a software associated with the inventive EEG device shown in FIG. 7. As it is shown in FIG. 8, the inventive user interface may display the visualization of EEG signals.

In some embodiments, the software may be installed on a computing device that is in communication with the EEG device. As detailed above, the computing device may include at least one personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

In some embodiments, the EEG device may communicate with the computing device via one or more direct or indirect computing interface technologies, including one or more wired and/or wireless connections. In some embodiments, the EEG device may interact with the computing device using one or more suitable local and/or network communication protocols, such as, e.g., a messaging protocol, a networking protocol, one or more application programming interfaces (APIs), or other suitable technique for communicating between computing systems or any combination thereof. For example, the EEG device may interact with the computing device over a network including the Internet using the HyperText Transport Protocol (HTTP) to communicate one or more API requests to cause the computing device to produce the user interface based on EEG measurements collected by the EEG device.

In another example, the computing device is connected to the EEG device via a local wired and/or wireless connection, such as, e.g., Universal Serial Bus (USB), IEEE 1394 (Fire Wire), Ethernet, Thunderbolt™, Serial ATA (SATA) (including eSATA, SATAe, SATAp, etc.), Ethernet, Local Area Network (LAN), wireless LAN (WLAN), WiFi, Bluetooth, Wi-Fi direct, or other suitable data communication technology or any combination thereof.

Accordingly, in some embodiments, the EEG device may collect EEG measurements while the wearer participates in a routine. For example, the user interface may direct the wearer to play a game, solve a puzzle, perform an action, or otherwise elicit a particular response or type of response from the wearer. As the wearer follows along with the user interface, the EEG device may collect the EEG measurements. In some embodiments, the EEG measurements may form a time-varying signal that can be synchronized in time with each elicited response directed by the user interface so as correlate variations in the EEG measurements with the series of portions of the routine directed by the user interface. In some embodiments, the EEG device may start collecting measurements once the software and the user interface commences the routine and ceases measurement when the user interface terminates the routine. Alternatively or in addition, the software may include time markers marking particular portions of the routine in time for which the EEG measurements may be keyed based on a time keeping mechanism of the EEG device.

In some embodiments, the EEG device may report a time-varying signal representative of the EEG measurements to the computing device. The EEG device may report the time-varying signal in real-time during the routine such that the software may generate visualizations thereof in the user interface in real-time. The EEG device may also or instead report the time-varying signal as a batch transmission upon completion of the routine to be processed and/or visualized after the end of the routine. Thus, in some embodiments, the computing device may provide an indication of the start and/or end of the routine to the EEG device so as to cause the EEG device to start and/or end measurement of the EEG measurements based on the start and/or end of the routine.

In some embodiments, the software may process the EEG measurements to determine characteristics of the wearer's mental state, such as a portion of a spectrum of a particular type of brainwaves indicated by the EEG measurements, such as Alpha, Beta, Gamma, Delta, Theta, or others or a combination thereof. In some embodiments, the software may output to the user interface a visualization of the characteristics of the wearer's mental state, such as, e.g., a scale, plot, map, graph or other visualization to visually represent the characteristics. For example, as depicted in FIG. 8, a plot that maps the wearer's Alpha, Beta, Gamma, Delta and Theta waves is depicted. In some embodiments, the software may additionally or alternatively output the time-varying signal of the EEG measurements to the user interface.

In some embodiments, the software may determine one or more scores associated with the wearer's mental state based on the EEG measurements. For example, as detailed above, a machine learning algorithm may ingest the EEG measurements and output a prediction including, e.g., a score for concentration, relaxation, stress, excitement, among other states or any combination thereof. For example, as illustrated in FIG. 8, the software may use the machine learning algorithm to determine a relaxation score and a concentration score that evaluates the wearer's degree of concentration and/or relaxation exhibited during the routine. Accordingly, in some embodiments, the user interface may provide feedback to the wearer during or after a routine to enable the wearer to understand their mental state, the affect particular actions have on their mental state, and their progress in improving characteristics of their mental such as the concentration and relaxation. Such feedback provides wearer practice in focus and relaxation, which may be particularly useful for individuals have neurodivergences such as ADHD or autism, among others.

Figure 9:
FIG. 9 illustrates the exemplary visualization of the inventive software that can be used in addition to the EEG device in accordance with one or more embodiments of the present disclosure.
Figure 9:
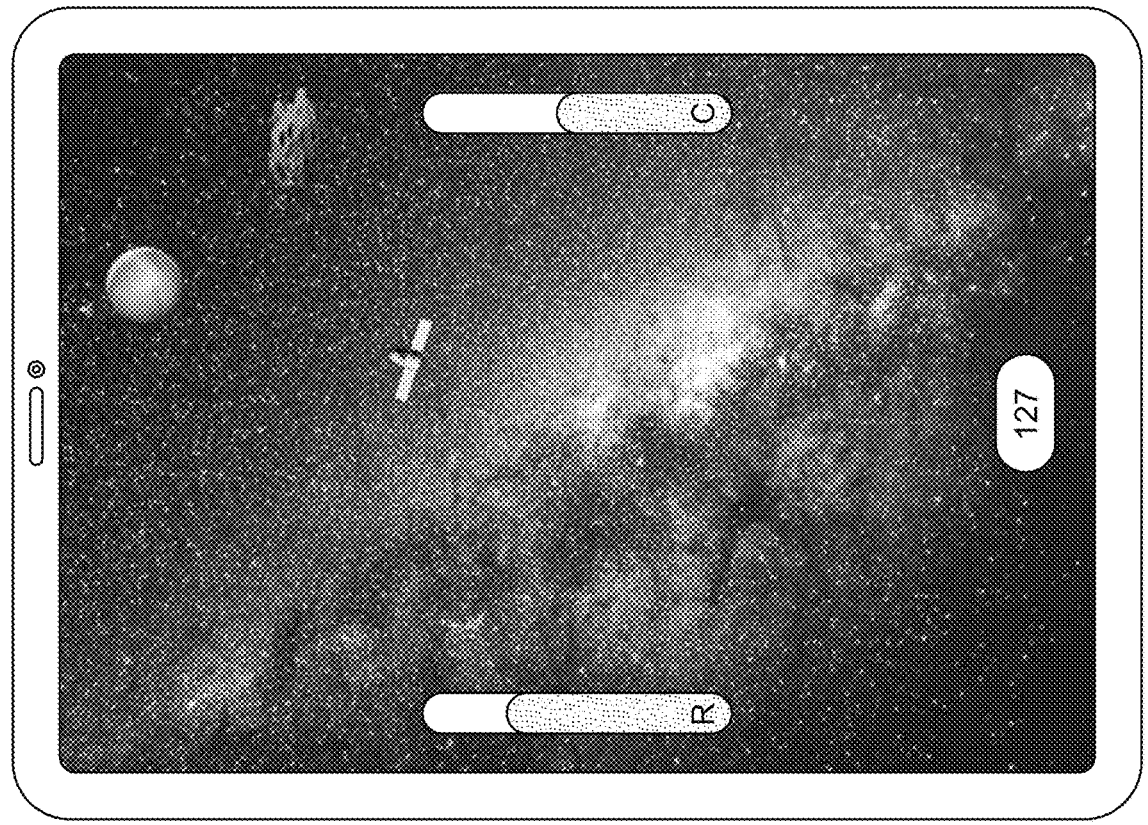

FIG. 9 illustrates the exemplary visualization of the inventive software that can be used in addition to the EEG device. In some embodiments, the exemplary inventive software may be programmed as a game controlled by the signals read by the EEG device. In some embodiments, at least two parameters may be used as game controls: relaxation and concentration. For example, the spaceship moves to the right or to the left depending on which of them is prevailing. In some embodiments, the exemplary inventive software may be programmed to translate these values to the game control. The relaxation and concentration parameters may be calculated by processing raw EEG signals applying the FFT transform and/or the like; for example, as described in Mohamed, Zainab et al. "Characterizing Focused Attention and Working Memory Using EEG." Sensors (Basel, Switzerland) vol. 18, 11 3743. 2 Nov. 2018, doi: 10.3390/s18113743 and/or A. Saidatul, M. P. Paulraj, S. Yaacob and M. A. Yusnita, "Analysis of EEG signals during relaxation and mental stress condition using AR modeling techniques," 2011 IEEE International Conference on Control System, Computing and Engineering, 2011, pp. 477-481, doi: 10.1109/ICCSCE.2011.6190573, each of which is incorporated by reference in its entirety.

In some embodiments, the software and the EEG device may be used for delivering the ADHD neurofeedback therapies to children. In some embodiments, illustrative systems of present description, as detailed herein, may be configured to utilize artificial intelligence algorithms to diagnose ADHD and/or suggest personalized training program(s). Due to the fact that 50 to 70% of individuals with ASD additionally experience ADHD symptoms, illustrative systems of present description may be utilized for delivering the ASD neurofeedback therapies to children.

In some embodiments, illustrative inventive EEG devices detailed herein may be used as a headphone. In some embodiments, illustrative systems of present description, as detailed herein, may be configured to be utilized in fitness applications. In some embodiments, illustrative inventive EEG devices detailed herein may be used in conjunction with VR hardware and/or applications (for example, the headset with sensors may be used to control the position and orientation of user's head, which in combination with a screen may be a full VR headset).

In other embodiments, some other headset design alternatives are possible. For example, the moving band may not be a single moving part, but instead, be constructed as two smaller moving parts, each of them may be connected to the fixed band with its own joint (i.e., "left" small moving band and "right" small moving band). Also, some electrodes may be placed on some additional fixed small bands around ears.

In some embodiments, the NFC can represent a short-range wireless communications technology in which NFC-enabled devices are "swiped," "bumped," "tap" or otherwise moved in close proximity to communicate. In some embodiments, the NFC could include a set of short-range wireless technologies, typically requiring a distance of 10 cm or less. In some embodiments, the NFC may operate at 13.56 MHz on ISO/IEC 18000-3 air interface and at rates ranging from 106 kbit/s to 424 kbit/s. In some embodiments, the NFC can involve an initiator and a target; the initiator actively generates an RF field that can power a passive target. In some embodiments, this can enable NFC targets to take very simple form factors such as tags, stickers, key fobs, or cards that do not require batteries. In some embodiments, the NFC's peer-to-peer communication can be conducted when a plurality of NFC-enable devices (e.g., smartphones) within close proximity of each other.

The processing disclosed herein may be implemented in software or firmware or a combination of them or as instructions stored on a machine-readable medium, which may be read and executed by one or more processors. A machine-readable medium may include any medium and/or mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others.

As used herein, the terms "computer engine" and "engine" identify at least one software component and/or a combination of at least one software component and at least one hardware component which are designed/programmed/configured to manage/control other software and/or hardware components (such as the libraries, software development kits (SDKs), objects, etc.).

Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. In some embodiments, the one or more processors may be implemented as a Complex Instruction Set Computer (CISC) or Reduced Instruction Set Computer (RISC) processors; x86 instruction set compatible processors, multi-core, or any other microprocessor or central processing unit (CPU). In various implementations, the one or more processors may be dual-core processor(s), dual-core mobile processor(s), and so forth.

In some embodiments, computer-related systems of the present disclosure m include any combination of hardware and software. Examples of software may include software components, operating system software, middleware, firmware, software modules, routines, subroutines, functions, methods, procedures, software interfaces, application program interfaces (API), instruction sets, computer code, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that make the logic or processor. Of note, various embodiments described herein may, of course, be implemented using any appropriate hardware and/or computing software languages (e.g., C++, Objective-C, Swift, Java, JavaScript, Python, Perl, QT, etc.).

As used herein, the term "server" should be understood to refer to a service point which provides processing, database, and communication facilities. By way of example, and not limitation, the term "server" can refer to a single, physical processor with associated communications and data storage and database facilities, or it can refer to a networked or clustered complex of processors and associated network and storage devices, as well as operating software and one or more database systems and application software that support the services provided by the server. Cloud servers are examples.

In some embodiments, as detailed herein, one or more of exemplary inventive computer-based systems/platforms, exemplary inventive computer-based devices, and/or exemplary inventive computer-based components of the present disclosure may obtain, manipulate, transfer, store, transform, generate, and/or output any digital object and/or data unit (e.g., from inside and/or outside of a particular application) that can be in any suitable form such as, without limitation, a file, a contact, a task, an email, a social media post, a map, an entire application (e.g., a calculator), etc. In some embodiments, as detailed herein, one or more of exemplary inventive computer-based systems/platforms, exemplary inventive computer-based devices, and/or exemplary inventive computer-based components of the present disclosure may be implemented across one or more of various computer platforms such as, but not limited to: (1) FreeBSD, NetBSD, OpenBSD; (2) Linux; (3) Microsoft Windows; (4) OS X (MacOS); (5) MacOS 11; (6) Solaris; (7) Android; (8) iOS; (9) Embedded Linux; (10) Tizen; (11) WebOS; (12) IBM i; (13) IBM AIX; (14) Binary Runtime Environment for Wireless (BREW); (15) Cocoa (API); (16) Cocoa Touch; (17) Java Platforms; (18) JavaFX; (19) JavaFX Mobile; (20) Microsoft DirectX; (21).NET Framework; (22) Silverlight; (23) Open Web Platform; (24) Oracle Database; (25) Qt; (26) Eclipse Rich Client Platform; (27) SAP NetWeaver; (28) Smartface; and/or (29) Windows Runtime.

In some embodiments, exemplary inventive computer-based system, and/or exemplary inventive computer-based components of the present disclosure may be configured to utilize hardwired circuitry that may be used in place of or in combination with software instructions to implement features consistent with principles of the disclosure. Thus, implementations consistent with principles of the disclosure are not limited to any specific combination of hardware circuitry and software. For example, various embodiments may be embodied in many different ways as a software component such as, without limitation, a stand-alone software package, a combination of software packages, or it may be a software package incorporated as a "tool" in a larger software product.

For example, exemplary software specifically programmed in accordance with one or more principles of the present disclosure may be downloadable from a network, for example, a website, as a stand-alone product or as an add-in package for installation in an existing software application. For example, exemplary software specifically programmed in accordance with one or more principles of the present disclosure may also be available as a client-server software application, or as a web-enabled software application. For example, exemplary software specifically programmed in accordance with one or more principles of the present disclosure may also be embodied as a software package installed on a hardware device.

In some embodiments, exemplary inventive computer-based system of the present disclosure may be configured to handle numerous concurrent users and/or communications/transactions that may be, but is not limited to, at least 100 (e.g., but not limited to, 100-999), at least 1,000 (e.g., but not limited to, 1,000-9,999), at least 10,000 (e.g., but not limited to, 10,000-99,999), at least 100,000 (e.g., but not limited to, 100,000-999,999), at least 1,000,000 (e.g., but not limited to, 1,000,000-9,999,999), at least 10,000,000 (e.g., but not limited to, 10,000,000-99,999,999), at least 100,000,000 (e.g., but not limited to, 100,000,000-999,999,999), at least 1,000,000,000 (e.g., but not limited to, 1,000,000,000-999,999,999,999), and so on.

As used herein, the terms "cloud," "Internet cloud," "cloud computing," "cloud architecture," and similar terms correspond to at least one of the following: (1) a large number of computers connected through a real-time communication network (e.g., Internet); (2) providing the ability to run a program or application on many connected computers (e.g., physical machines, virtual machines (VMs)) at the same time; (3) network-based services, which appear to be provided by real server hardware, and are in fact served up by virtual hardware (e.g., virtual servers), simulated by software running on one or more real machines (e.g., allowing to be moved around and scaled up (or down) on the fly without affecting the end user).

[GT to add numbered clauses section based on final claims]

While one or more embodiments of the present disclosure have been described, it is understood that these embodiments are illustrative only, and not restrictive, and that many modifications may become apparent to those of ordinary skill in the art, including that various embodiments of the inventive methodologies, the illustrative systems and platforms, and the illustrative devices described herein can be utilized in any combination with each other. Further still, the various steps may be carried out in any desired order (and any desired steps may be added and/or any desired steps may be eliminated).

What is claimed is:

1. A device comprising:
   a first ear cup configured to fit over a first ear of a wearer;
   a second ear cup configured to fit over a second ear of the wearer;
   a main band attached to the first ear cup on a first side of the main band and the second ear cup on a second side of the main band;
      wherein the main band comprises at least two fixed dry electroencephalography (EEG) sensors of a plurality of EEG sensors;
      wherein the at least two fixed dry EEG sensors are positioned on the main band so as to contact a scalp of the wearer in at least two scalp zones so as to detect EEG measurements associated with at least two areas of a brain of the wearer;
   a first moveable band pivotably attached to the first ear cup;
      wherein the first moveable band comprises at least one moveable dry EEG sensor of the plurality of EEG sensors;
      wherein the first moveable band is configured to:
         pivot relative to the main band and the first ear cup between a first location and a second location, wherein, at the first location, the first movable band parallelly overlaps the main band when viewed from a side of the main band, and wherein, at the second location, the first movable band and the main band form an angle when viewed from the side of the main band; and
         adjust to at least one position of the at least one moveable dry EEG sensor on the scalp of the wearer so as to result in contact between the at least one moveable dry EEG sensor and the scalp of the wearer in at least one scalp zone to detect EEG measurements associated with at least one other area of the brain;

at least one processing device configured to:
  establish a communication link with a personal computing device;
  synchronize a time reference of EEG measurements with the personal computing device, displaying a predetermined content;
  measure at least one set of the EEG measurements during the display of the predetermined content, the at least one set of the EEG measurements comprising:
    a first subset of the EEG measurements of at the at least two areas of the brain using the at least two fixed dry EEG sensors,
    a second subset of the EEG measurements of at the at least one other area of the brain using the at least one moveable dry EEG sensors; and
  transmit the time-synchronized EEG measurements to the personal computing device to facilitate the personal computing device to display an indication of a mental state of the wearer, the indication being derived from the at least one set of the EEG measurements.

2. The device of claim 1, wherein the at least one processing device is further configured to:
  transmit the at least one set of EEG measurements to an external computing device for outputting, by utilizing a machine learning model, a prediction of a mental condition, a mental state or both of the wearer based on the at least one set of EEG measurements.

3. The device of claim 1, wherein the plurality of EEG sensors comprises:
  at least one reference EEG sensor,
  at least one ground EEG sensor and
  at least two active EEG sensors.

4. The device of claim 1, wherein the at least one processing device is further configured to:
  receive, from a software of an external computing device, an indication of a start to a routine;
  commence measuring the at least one set of EEG measurements via the plurality of EEG sensors;
  transmit, in real-time during the routine to the external computing device, at least one time varying signal representative of the at least one set of EEG measurements during the measuring of the at least one set of EEG measurements;
  receive, from the software of the external computing device, an indication of an end to the routine; and
  terminate, based on the indication of the end of the routine, measuring the at least one set of EEG measurements.

5. The device of claim 1, wherein the at least one processing device is further configured to:
  receive, from a software of an external computing device, an indication of a start to a routine;
  commence measuring the at least one set of EEG measurements via the plurality of EEG sensors;
  receive, from the software of the external computing device, an indication of an end to the routine;
  terminate, based on the indication of the end of the routine, measuring the at least one set of EEG measurements; and
  transmit, to the external computing device, at least one time-varying signal representative of the at least one set of EEG measurements upon terminating the measuring of the at least one set of EEG measurements.

6. The device of claim 1, further comprising a second moveable band pivotably attached to the second ear cup, the second moveable band having at least one second moveable dry EEG sensor, wherein the second moveable band is separate from the first moveable band.

7. The device of claim 1, wherein the first moveable band comprises at least one hinge on the first ear cup, the at least one hinge configured to enable the first moveable band to rotate about the first ear cup so as to adjust at least one position of the first moveable band relative to the scalp of the wearer, wherein the at least one hinge comprises a ball joint.

8. The device of claim 1, wherein the first ear cup comprises at least one speaker; and
  wherein the at least one processing device is further configured to:
    receive audio from an external computing device; and
    control the at least one speaker to play the audio to the wearer.

9. The device of claim 8, wherein the audio comprises instructions to the wearer to adjust at least one position of the at least one moveable band according to a routine of actions.

10. The device of claim 1, further comprising at least one gyroscope; and
  wherein the at least one processing device is further configured to:
    detect, using the at least one gyroscope, at least one movement of a head of the wearer; and
    measure the at least one set of EEG measurements based at least in part on the at least one movement.

11. The device of claim 1, further comprising at least one photoplethysmogram (PPG) sensor;
  wherein the at least one processing device is further configured to:
    detect, using the at least one PPG sensor, at least one oxygen level of blood of the wearer; and
    transmit, to the external computing device, at least one time-varying signal representative of the at least one set of EEG measurements and the at least one oxygen level.

12. The device of claim 1, wherein the at least one processing device comprises at least one on-device processor local to the device; and
  wherein the at least one processing device is further configured to:
    receive at least one EEG signal from at least one of the at least two fixed dry EEG sensors or the at least one moveable dry EEG sensor;
    apply at least one signal processing mechanism to the at least one EEG signal to extract the at least one set of EEG measurements;
    wherein the at least one signal processing mechanism comprises at least one of:
      at least one signal processing algorithm, or
      at least one digital filter.

13. A method, comprising:
  measuring, by at least one processing device of an electroencephalography (EEG) device, at least one set of EEG measurements, the at least one set of EEG measurements comprising:
    a first subset of EEG measurements of at least two areas of a brain of a wearer using at least two fixed dry EEG sensors, a second subset of EEG measurements of at least one other area of the brain using at least one moveable dry EEG sensors;
wherein the EEG device comprises:
a first ear cup configured to fit over a first ear of the wearer;
a second ear cup configured to fit over a second ear of the wearer;
a main band attached to the first ear cup on a first side of the main band and the second ear cup on a second side of the main band;
wherein the main band comprises the at least two fixed dry EEG sensors of a plurality of EEG sensors;
wherein the at least two fixed dry EEG sensors are positioned on the main band so as to contact a scalp of the wearer in at least two scalp zones so as to detect EEG measurements associated with the at least two areas of a brain of the wearer;
a first moveable band pivotably attached to the first ear cup;
wherein the first moveable band comprises the at least one moveable dry EEG sensor of the plurality of EEG sensors; and
wherein the first moveable band is configured to:
pivot relative to the main band and the first ear cup between a first location and a second location, wherein, at the first location, the first movable band parallelly overlaps the main band when viewed from a side of the main band, and wherein, at the second location, the first movable band and the main band form an angle when viewed from the side of the main band; and
adjust to at least one position of the at least one moveable dry EEG sensor on the scalp of the wearer so as to result in contact between the at least one moveable dry EEG sensor and the scalp of the wearer in at least one scalp zone to detect EEG measurements associated with the at least one other area of the brain;
establishing, by the at least one processing device, a communication link with a personal computing device;
synchronizing, by the at least one processing device, a time reference of EEG measurements with the personal computing device, displaying a predetermined content;
measuring at least one set of the EEG measurements during the display of the predetermined content, the at least one set of the EEG measurements comprising:
a first subset of the EEG measurements of at the at least two areas of the brain using the at least two fixed dry EEG sensors,
a second subset of the EEG measurements of at the at least one other area of the brain using the at least one moveable dry EEG sensors; and
transmitting, by the at least one processing device, the time-synchronized EEG measurements to the personal computing device to facilitate the personal computing device to display an indication of a mental state of the wearer, the indication being derived from the at least one set of the EEG measurements.

14. The method of claim 13, further comprising:
transmitting, by the at least one processing device, the set of EEG measurements to an external computing device so as to cause software of the external computing device to utilize a machine learning model to output a prediction of a mental condition, a mental state or both of the wearer based on the set of EEG measurements.

15. The method of claim 13, wherein the plurality of EEG sensors comprises:
at least one reference EEG sensor,
at least one ground EEG sensor and
at least two active EEG sensors.

16. The method of claim 13, further comprising:
receiving, by the at least one processing device from a software of an external computing device, an indication of a start to a routine;
commencing, by the at least one processing device, measuring the at least one set of EEG measurements via the plurality of EEG sensors;
transmitting, in real-time during the routine, by the at least one processing device to the external computing device, at least one time varying signal representative of the at least one set of EEG measurements during the measuring of the at least one set of EEG measurements;
receiving, by the at least one processing device from the software of the external computing device, an indication of an end to the routine; and
terminating, by the at least one processing device, based on the indication of the end of the routine, measuring the at least one set of EEG measurements.

17. The method of claim 13, further comprising:
receiving, by the at least one processing device from a software of an external computing device, an indication of a start to a routine;
commencing, by the at least one processing device, measuring the at least one set of EEG measurements via the plurality of EEG sensors;
receiving, by the at least one processing device from the software of the external computing device, an indication of an end to the routine;
terminating, by the at least one processing device, based on the indication of the end of the routine, measuring the at least one set of EEG measurements; and
transmitting, by the at least one processing device to the external computing device, at least one time-varying signal representative of the at least one set of EEG measurements upon terminating the measuring of the at least one set of EEG measurements.

18. The method of claim 13, further comprising a second moveable band pivotably attached to the second ear cup, the second moveable band having at least one second moveable dry EEG sensor, wherein the second moveable band is separate from the first moveable band.

19. The method of claim 13, wherein the first moveable band comprises at least one hinge on the first ear cup, the at least one hinge configured to enable the first moveable band to rotate about the first ear cup so as to adjust at least one position of the first moveable band relative to the scalp of the wearer, wherein the at least one hinge comprises a ball joint.

20. The method of claim 13, further comprising:
receiving, by the at least one processing device, audio from an external computing device; and
controlling, by the at least one processing device, at least one speaker to play the audio to the wearer, wherein the first ear cup comprises the at least one speaker.

21. The method of claim 20, wherein the audio comprises instructions to the wearer to adjust at least one position of the at least one moveable band according to a routine of actions.

22. The method of claim 13, further comprising:
detecting, by the at least one processing device using at least one gyroscope, at least one movement of a head of the wearer; and
measuring, by the at least one processing device, the at least one set of EEG measurements based at least in part on the at least one movement.

23. The method of claim 13, further comprising:
detecting, by the at least one processing device using at least one PPG sensor, at least one oxygen level of blood of the wearer; and
transmitting, by the at least one processing device to the external computing device, at least one time-varying signal representative of the at least one set of EEG measurements and the at least one oxygen level.

24. The method of claim 13, further comprising:
receiving, by the at least one processor, at least one EEG signal from at least one of the at least two fixed dry EEG sensors or the at least one moveable dry EEG sensor;
  wherein the at least one processing device comprises at least one on-device processor local to the EEG device; and
applying, by the at least one processor, at least one signal processing mechanism to the at least one EEG signal to extract the at least one set of EEG measurements;
  wherein the at least one signal processing mechanism comprises at least one of:
    at least one signal processing algorithm, or
    at least one digital filter.

\* \* \* \* \*